Patented Dec. 5, 1950

2,532,407

UNITED STATES PATENT OFFICE 2,532,407

CORROSION INHIBITING COMPOSITIONS

Sven Christian Johansson, Goteborg, Sweden

No Drawing. Application August 29, 1946, Serial
No. 693,816. In Sweden September 5, 1945

2 Claims. (Cl. 106—14)

This invention relates to lubricants, coating materials such as paints, varnishes, lacs and to disinfectants and like products the object of the invention being to produce compositions of these kinds which will be of a non-corrosive character. To this end said products are mixed with a salt of an organic compound of the general type formula $R.CH_2.NO_2$ or

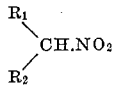

in which R, $R_1$ and $R_2$ represent hydrogen, aliphatic or cyclic groups, for example, aromatic groups, which may contain OH, $NH_2$, $NO_2$ or other groups. $R_1$ and $R_2$ may be like or different groups. The salts are by preference alkali salts, of which the lithium salts may be mentioned especially. Also the salts of said compounds with organic bases (amines) are useful for the purpose in question.

The lithium salt, for example, is prepared according to known principles in the following way:

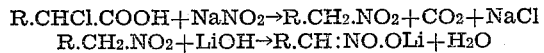

The salts referred to herein are nitronic acid salts, by which is intended the usual understanding of a salt formed by a salt-forming element or radical attached to the nitro group through one of its two oxygen atoms.

A second compound mentioned as an example is a salt of $NO_2.C_6H_4.CH_2.NO_2$ such as the lithium salt of nitrophenylnitromethane.

The compounds mentioned are added to the lubricant oil, the coating material, the paint or the disinfectant either in a solid, finely divided state or dissolved in water, methanol, glycerine or another suitable solvent or mixture of solvents.

The following examples of their rust inhibiting action may be mentioned. A water solution of 1 part of weight of the lithium salt of nitromethane in 25,000 parts of weight of water has no corrosive action on carbon steel (ball-bearing balls) which has been immersed in said water solution during several months. In the presence of 1% of NaCl in the water 1 part of weight of the lithium salt of nitroethane in 1000 parts of weight of water protects against formation of rust during 3 months. Without addition of the rust inhibiting agent the objects are attacked by rust within about one hour. As a rule the alkali salts of the nitroparaffins are amorphous and form faintly yellowish powder and are easily soluble in water. The lithium salts appear to be more resistant than other alkali salts.

As distinguished from $LiNO_2$, for example, said combinations are not hygroscopic which is an advantage in the use of the same in paints or in mixtures with other solid substances such as disinfectants in form of powder or tablets.

The solubility in methanol for the lithium salt of nitromethane is about 10%. When this compound is to be mixed with paraffin oil or other oils the saturated methanol solution of said compound may be diluted with equal parts of amyl-alcohol whereupon the solution thus obtained is mixed with the oil.

What I claim is:

1. A corrosion inhibiting, surface treating composition consisting essentially of a liquid, metal surface coating agent which is a member of the class consisting of a lubricant, paint, varnish, lacquer, and disinfectant, and containing therein a minor amount of an alkali salt of a nitroparaffin sufficient to impart to said liquid coating agent when applied to the metal surface the capacity to inhibit the corrosion of the metal surface, said nitroparaffin being a member of the class consisting of nitromethane, nitroethane, and nitrophenylnitromethane.

2. A composition as claimed in claim 1, wherein the salt of the nitroparaffin contained in the composition is the lithium salt.

SVEN CHRISTIAN JOHANSSON.

REFERENCES CITED

The following references are of record in the file of this patent:

UNITED STATES PATENTS

| Number | Name | Date |
|---|---|---|
| 1,439,780 | Williams | Dec. 26, 1922 |
| 2,321,517 | Rosen | June 8, 1943 |
| 2,387,999 | Knutson et al. | Oct. 30, 1945 |
| 2,411,593 | Routson | Nov. 26, 1946 |

OTHER REFERENCES

Karrer: "Organic Chemistry," Nordemann Publishing Co., New York, N. Y., 1938, pp. 122–123.

Paint, Oil, and Chemical Review, August 27, 1942, pages 9–11, 14, 34, and 35. (Article, "How the Coating Industry is Using the Nitroparaffins.")

Hass et al.: "Chemical Reviews," volume 32, June 1943, pp. 373–430.

Hass: "Industrial and Engineering Chem.," volume 35, Nov. 1943, pp. 1146–1152.

Degering: "Organic Nitrogen Compounds," University Litho-Printers, Ypsilanti, Michigan, 1945, pp. 71–73.